United States Patent [19]
Hayashi

[11] Patent Number: 5,284,397
[45] Date of Patent: Feb. 8, 1994

[54] JOINT APPARATUS

[75] Inventor: Akira Hayashi, Kiryu, Japan

[73] Assignee: Mitsuba Electric Manufacturing Co., Ltd., Gumma, Japan

[21] Appl. No.: 856,500

[22] Filed: Mar. 24, 1992

[30] Foreign Application Priority Data

Mar. 25, 1991 [JP] Japan .................. 3-025709[U]

[51] Int. Cl.$^5$ ........................................ F16C 11/00
[52] U.S. Cl. ................................................ 403/114
[58] Field of Search ............. 403/114, 71; 15/250.31, 15/250.27

[56] References Cited

U.S. PATENT DOCUMENTS

| | | | |
|---|---|---|---|
| 3,389,925 | 6/1968 | Gottschald | 403/113 |
| 4,055,385 | 10/1977 | Bjors | 403/114 X |
| 4,266,883 | 5/1981 | Riester | . |
| 4,520,689 | 6/1985 | Sucro | . |
| 4,550,469 | 11/1985 | Deutscher | . |
| 4,613,251 | 9/1986 | Bellamy | 403/114 X |
| 4,695,180 | 9/1987 | Saito | 403/114 |
| 4,799,288 | 1/1989 | Kumizawa | . |
| 4,843,898 | 7/1989 | Ishikawa | 403/71 |
| 4,993,863 | 2/1991 | Inoue | 403/71 |
| 5,013,175 | 5/1991 | Hayden | 403/114 X |

Primary Examiner—Randolph A. Reese
Assistant Examiner—Anthony Knight
Attorney, Agent, or Firm—McGlew and Tuttle

[57] ABSTRACT

A joint apparatus which has a spherical bearing member which is outsert-molded at the end of a rod, a spherical shaft inserted to the spherical bearing member rotatably in three-dimensional directions, a circular concave portion provided at the top of the spherical shaft, and a convex portion provided in protrusion at the spherical bearing member and inserted into the concave portion. The convex portion is formed to have the width perpendicular to the axis of the rod, being larger than the longitudinal width.

8 Claims, 5 Drawing Sheets

F I G. 5
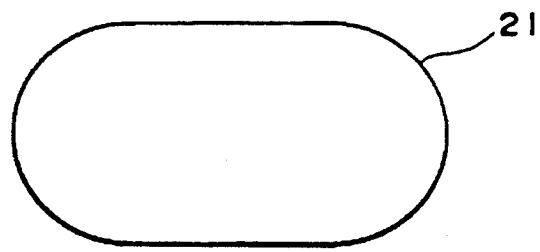
F I G. 6
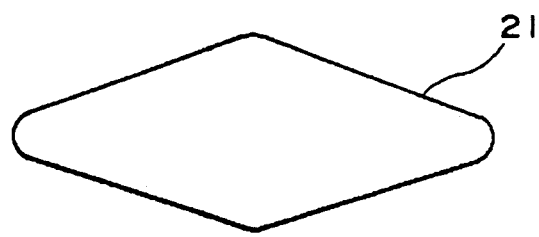
F I G. 7
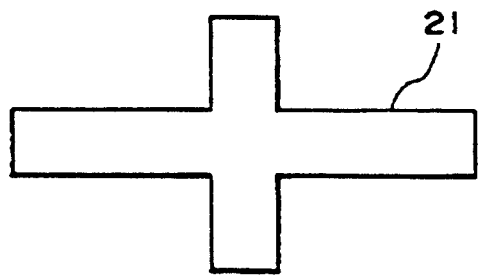

JOINT APPARATUS

BACKGROUND OF THE INVENTION

1. Field of the Invention

This invention relates to a joint apparatus which connects a couple of rods oscillatably in three dimensional directions and more particularly to a technique for controlling the angle of oscillation, which can be effectively used, for example, in a joint apparatus provided between a crank arm and a rod in a wiper apparatus mounted on a vehicle such as an automobile.

2. Related Art Statement

There has been a wiper apparatus for wiping automobile window glass, which comprises a crank arm rotated by a motor; a connecting rod (hereinafter referref to as a rod) for converting the rotation of the crank arm into reciprocating motion so as to reciprocatively rotate a linkage connected with a wiper arm; and a joint apparatus provided between the crank arm and the rod for enabling three dimensional oscillation.

Among joint apparatuses used in such a wiper apparatus, there has been one in which spherical bearing members of resin as joint members are integrally formed (hereinafter referred to as outsert-molding) at both ends of the rod, and spherical shafts as pair joint members are inserted respectively into the spherical bearing members.

In the joint apparatus thus-described, in order to prevent the spherical shaft from falling off the spherical bearing member, a circular concave portion is recessed at the top of the spherical shaft; a circular convex portion which is smaller than the concave portion, is projectingly provided at the spherical bearing member; and the convex portion is inserted in the concave portion. When the rod is bent in the direction perpendicular to its axial direction, the concave and the convex parts in this joint apparatus are designed to interfere mutually in order to prevent an accident in which the spherical shaft falls off the spherical bearing member and to control excess relative swing movement between the spherical shaft and the spherical bearing member.

However, in the above joint apparatus, the concave and the convex parts in the spherical shaft and the spherical bearing member are respectively formed to similar large and small circular shapes so that the angle $\theta$ of oscillation formed by the spherical shaft and the spherical bearing member, which is delimited by the concave and the convex, parts has the same maximal value for the all circumferential directions, inviting the following problems.

(1) In the wiper apparatus, the maximum value of the inclination angle $\alpha$ formed by the rod and the crank arm (hereinafter referred to as lengthwise angle) is determined by the relation L/O of the distance L between the spherical centers to the fall O between the spherical centers in a pair of joint apparatuses mounted at both ends of the rod. The lengthwise angle $\alpha$ is essential for the operation of the wiper system and as a result the oscillation angle $\theta$ must not be set smaller than the lengthwise angle $\alpha$. As a consequence, the angle of rotation $\beta$ (hereinafter referred to as widthwise angle) having its center on the axis of the rod can not be set smaller than the lengthwise angle $\alpha$.

(2) When the widthwise angle $\beta$ is large, it makes the sealing of the joint apparatus difficult.

(3) In addition, in the case of curving rod there is a problem that when the widthwise angle $\beta$ is large, a large widthwise space must be secured.

SUMMARY OF THE INVENTION

The object of the present invention is to provide a joint apparatus in which the relation between the lengthwise angle and the widthwise angle in the oscillation angle can be freely set.

In the present invention, a joint apparatus connecting a couple of rods oscillatably comprises a spherical bearing member of resin, having a spherical bearing portion and an aperture opened to the spherical bearing portion; a cylindrical shaft as shaft with a spherical portion which is pushed to be inserted into the spherical bearing member through the aperture; a circular concave portion recessedly provided at a top of the cylindrical spherical shaft, and a convex portion projectedly provided in said spherical bearing member to be inserted into said concave portion, and formed to have a larger width perpendicular to the axis of the rod than a width in a direction of the axis of said rod.

According to the above joint apparatus of the present invention, the widthwise angle $\beta$ is smaller than the lengthwise angle $\alpha$ because the convex portion of the spherical bearing member abuts against the concave portion of the spherical shaft in the widthwise direction earlier than in the axial direction of the rod.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENTS

Figure 1:
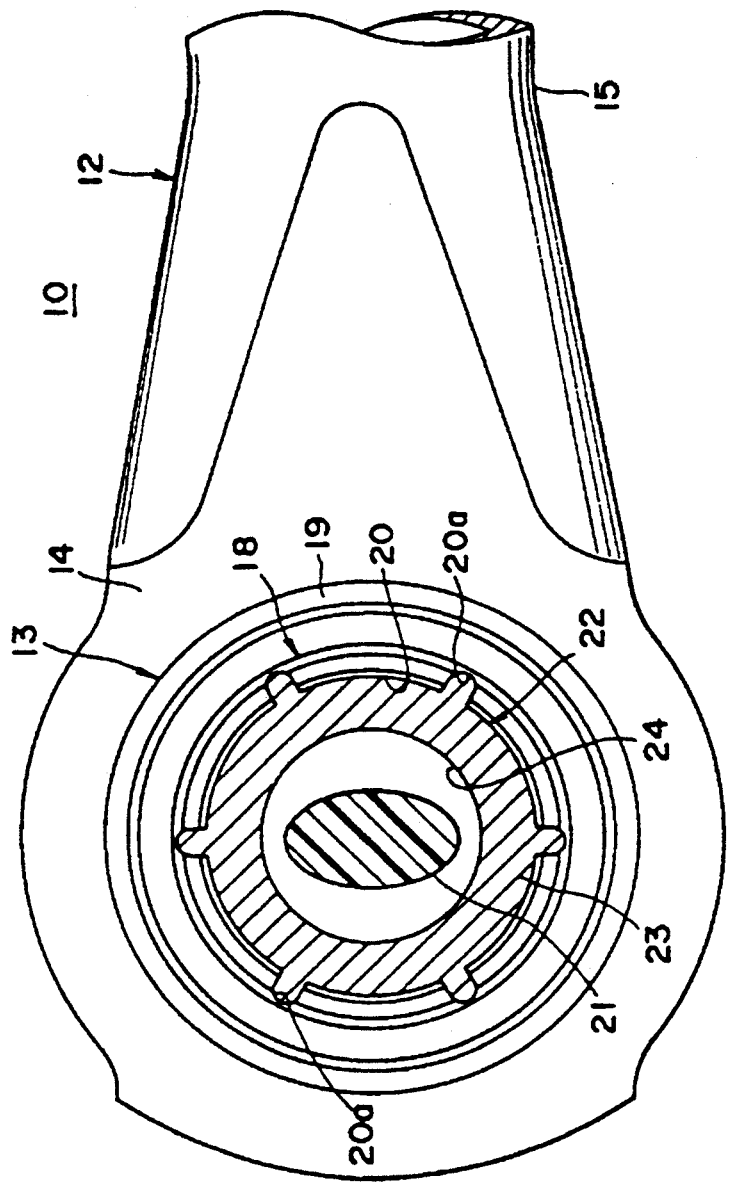
FIG. 1 is a partially omitted cross-sectional view showing a joint apparatus as an embodiment of the present invention.
Figure 2:
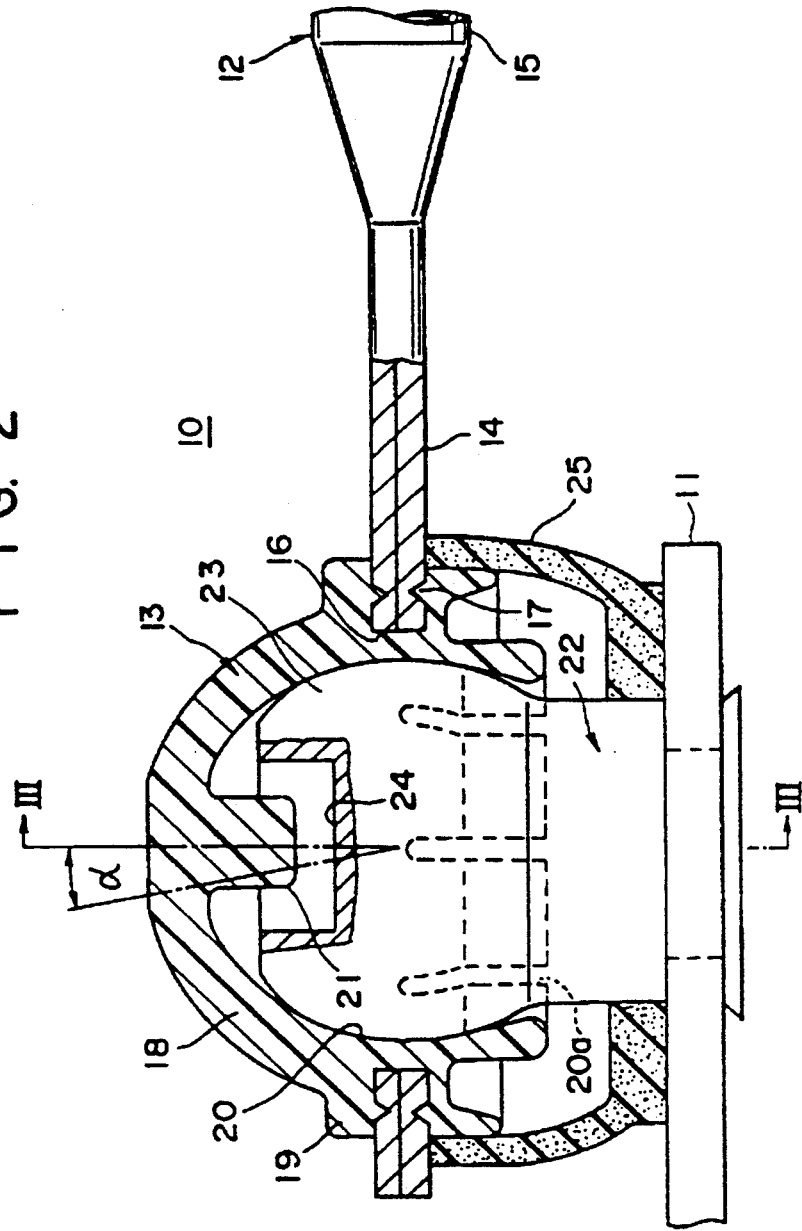
FIG. 2 is a length wise vertical sectional view thereof.

Referring to the drawings, a joint apparatus 10 according to the present invention, shown in FIG. 1, is used in a joint portion of a wiper apparatus, and is arranged between a crank arm and a rod in order to convert the rotary movement to the reciprocating one while ensuring a three dimensional oscillation between the crank arm and the rod. Namely, as shown in FIG. 2, at a free end of a crank arm 11 as one rod which integrally rotates with a shaft (not shown) of a wiper driving apparatus in the wiper apparatus, one end of a connecting rod 12 as the other rod is connected rotatably in the three dimensional directions through the joint apparatus 10. Although not shown, the other end of the rod 12 is rotatably connected to a free end of a linkage rotatably in the three dimensional directions through another joint apparatus. The other end of the linkage is fixed to a wiper shaft rotatably supported at the lower position of the automobile window frame. The wiper arm, which is supporting a wiper blade at its free end, is supported by the wiper shaft to rotate integrally with the linkage.

The joint apparatus 10 according to the present invention is provided between the crank arm 11 and the rod 12 and comprises a spherical bearing member 13 as a joint member of resin, the spherical bearing member 13 is outsert-molded at a mounting hole 16 provided at an end of the rod 12 with its axis aligned with the hole; A cylindrical shaft 22 is inserted in the spherical bearing member 13 so as to be rotatable in the three dimensional directions.

The rod 12 is integrally formed by press working a round pipe into a shape shown in FIGS. 1 and 2 (only partially shown) and its end is outsert-molded with the spherical bearing member 13. The whole of the rod 12 is formed into a pipe shape, and at both ends of the rod 12 (only one end is shown), mounting portion 14, where the spherical bearing member 13 is to be outsert-molded, are respectively formed in a flattened oval shape having width larger than that of a pipe shaped portion 15. The mounting hole 16 to be outsert-molded with the spherical bearing member 13 is provided by cutting through the mounting portion 14 of the rod 12 concentrically therewith. A pair of V-shaped grooves 17 are concentrically provided in the vicinity of the mounting hole 16 and formed into circular arcs at both obverse and reverse of the mounting portion 14.

The spherical bearing member 13 of a suitable resin, is outsert-molded at the mounting hole 16 of the mounting portion 14 of the rod 12 with its axis aligned with the hole 16, and has a main body 18 of an inverted pot shape. The main body 18 of the spherical bearing member 13 has a flange portion 19 projectedly provided on its outer circumference, and is integrally combined with internal circumferential portion of the mounting hole 16 of the mounting portion 14 of the rod at this flange portion 19. Under that condition, the resin of the flange 19 fills the grooves 17 of the rod, thereby improving the connection and locking the rotation therebetween. In the hollow portion of the main body 18, a spherical bearing portion 20 is formed to have a slightly larger space than a hollow semi-sphere. The spherical bearing portion 20 is constructed to support the cylindrical shaft 22 rotatably in three dimensional directions. A plurality of slits 20a are provided at the aperture of the spherical bearing portion 20 at intervals in the circumferential direction, each slit extending toward the axial direction at intervals in the circumferential direction. Elasticity of the spherical bearing portion 20 permits opening and shutting of the slits 20a, and thereby the cylindrical shaft 22 can be inserted into the spherical bearing portion 20.

Figure 3:
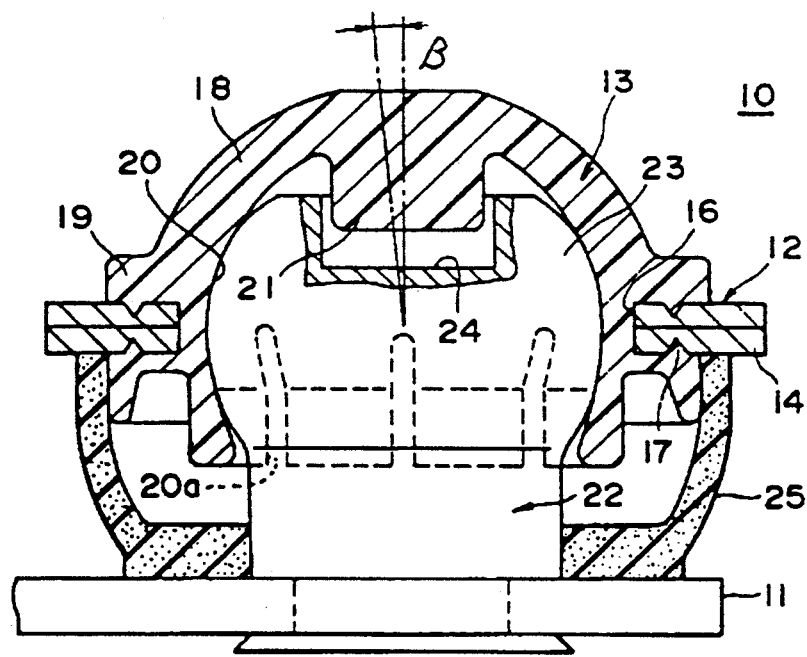
FIG. 3 is a width-wise sectional view taken along line III—III of FIG. 2.

A convex portion 21 is downwardly provided concentrically with the center line of the mounting hole 16 on the ceiling of the hollow portion of the main body 18. The convex portion 21 is inserted into a circular concave portion 24 recessedly provided at the top of the cylindrical shaft 22 and is constructed to prevent excessive displacement of the cylindrical shaft 22. In the present embodiment, the section of the convex portion 21 is formed into an oval shape as shown in FIG. 1. The major axis of the oval shape coincides with the width direction of the rod 12 as the minor axis does with the longitudinal direction, i.e. the axial direction, of the rod 12, and its center coincides with the center of the cylindrical shaft 22. The width direction of rod 12 and the width-wise angle $\beta$ being substantially perpendicular to the longitudinal direction, i.e. axial direction of both the rod 12 and the cylindrical shaft 22, as shown in FIGS. 2 and 3. The width-wise and longitudinal directions of rod 12 being substantially parallel to a plane of rotation of crank arm 11.

As a whole, the cylindrical shaft 22 is formed into a generally cylindrical shape, and a spherical shaft portion 23 is integrally formed at its one end. The spherical shaft portion 23 is formed into such a shape that the upper and lower portions of spherical shape are cut respectively and is designed to be inserted into and supported by the spherical bearing portion 20 of said spherical bearing member 13. The concave portion 24 is recessedly provided in a shape of cylinder hole at the end surface of the spherical bearing portion 23 (hereinafter also referred to as ball portion). Into the circular concave portion 24, the oval convex portion 21 is inserted with their axes aligned.

A dust seal 25 which is made of an elastic material like rubber and formed generally in a pot shape is provided between the crank arm 11 and the rod 12 in the vicinity of the cylindrical shaft 22, so that the lower and upper end surfaces of the dust seal 25 contact respectively with end surfaces of the crank arm 11 and the rod 12. The dust seal 25 seals the spherical bearing member 13 and the cylindrical shaft 22.

Next, the function of the present embodiment will be described.

When installing the cylindrical shaft 22 into the spherical bearing member 13 which is outsert-molded to the mounting hole 16 of the mounting portion 14 of the rod 12 with its center aligned with the hole, the cylindrical shaft 22 is pushed into the spherical bearing member 13 after its ball portion 23 is inserted into the lower aperture of the spherical bearing portion 20 of the spherical bearing member 13. At that time, the dust seal 25 is attached to the exposed surface of the cylindrical shaft 22.

When the crank arm 11 rotates, the cylindrical shaft 22 which is fixed at the free end of the crank arm 11 revolves, thereby the rod 12 whose other end is connected to the linkage is reciprocatively and oscillatingly moved. During that time, the spherical bearing member 13 which is fixed to the rod 12 is three-dimensionally oscillated or rotatable with respect to cylindrical shaft 22, so that the rotation of the crank arm 11 is converted extremely smoothly into reciprocative movement of the rod 12.

When there is a fall (distance in the depth direction of the rod) between the joint apparatuses 10 and 10 provided at both ends of the rod 12, or when the rod 12 is bent expanding to the depth direction owing to the lengthwise compressive force, the spherical bearing member 13 inclines against the cylindrical shaft 22 with a lengthwise angle $\alpha$ during the above operation. Even when the lengthwise angle $\alpha$ becomes large, inclination over a predetermined angle can be prevented since the minor axis side of the oval convex portion 21 provided at the spherical bearing member 13 contacts with the opposed part in the internal circumference of the circular concave portion 24 provided at the cylindrical shaft 22.

Furthermore, when the rod 12 is curved, or when the force acts to let the rod 12 rotate with its axis as the center, the spherical bearing member 13 inclines against the cylindrical shaft 22 with a widthwise angle $\beta$ during the above operation. And, even when the widthwise angle $\beta$ becomes large, inclination over a predetermined angle can be prevented since the major axis side of the oval convex portion 21 provided at the spherical bearing member 13 contacts with the opposed part in the internal circumference of the circular concave portion 24 provided at the cylindrical shaft 22.

Figure 4:
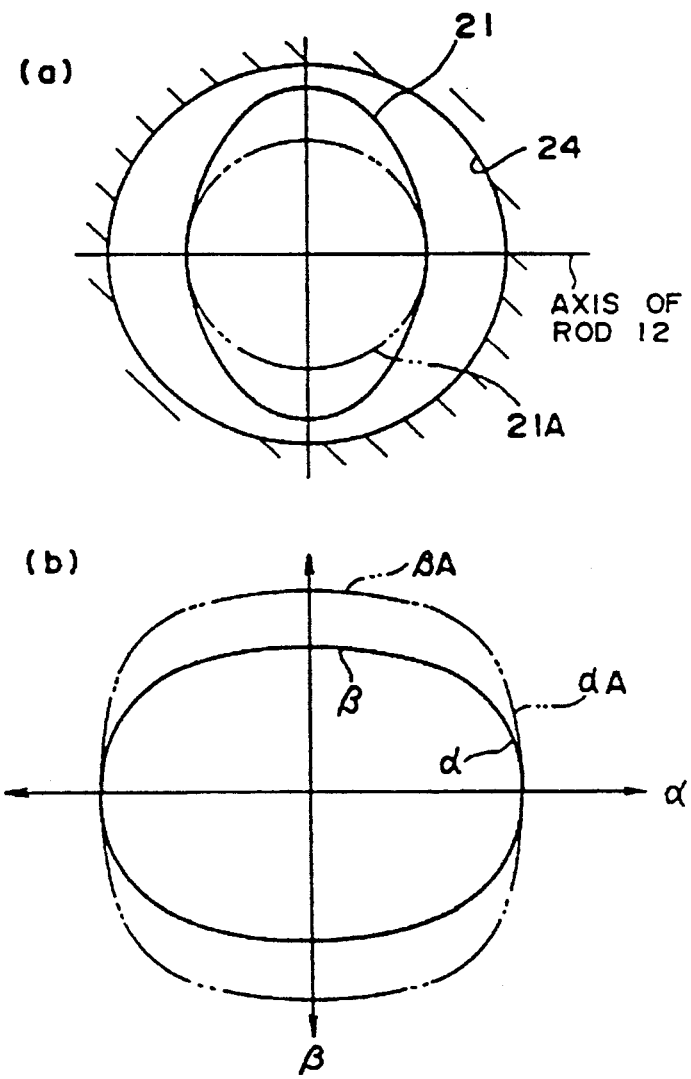
FIGS. 4(a) and 4(b) are views explaining the operation of the joint apparatus of the present invention; and, FIGS. 5 to 7 are views showing other embodiments of the convex portion of the spherical bearing member according to the present invention.

As shown in FIG. 4(a) with a solid line, the concave portion 24 of the cylindrical shaft 22 is formed into a circular shape and the convex portion 21 of the spherical bearing member 13 is formed into an oval shape. Further, the oval center coincides with the circular center, and the major axis of the oval is arranged perpendicular to the axis of the rod 12 and the minor axis is arranged in the axial direction of the rod 12. Therefore, the relation between lengthwise angle $\alpha$ and widthwise angle $\beta$ of the oscillation angle $\theta$ between spherical bearing member 13 and cylindrical axis 22, which is regulated by the cooperation of convex portion 21 with concave portion 24, is that the widthwise angle $\beta$ is controlled to be a smaller angle than the lengthwise angle $\alpha$ as shown in FIG. 4(b) by solid line.

Accordingly, in the present embodiment, the widthwise angle $\beta$ can be set smaller than the lengthwise angle $\alpha$ for the oscillation angle $\theta$ of the spherical bearing member 13 and the cylindrical shaft 22, so that the sealing range of the seal 25 can be set smaller. As a result, the structure of the seal 25 can be simplified, and thereby the sealing performance can be improved.

In addition, when the rod 12 is curved, the angle of inclination of the rod 12 can be controlled smaller because the widthwise angle $\beta$ can be set smaller than the lengthwise angle $\alpha$. As a result, when the rod 12 is inclined, the range for the rod 12 to depart from its own axis can be regulated, and therefore the space around the rod 12 can be designed smaller.

On the contrary, as shown in FIG. 4(a) with a dotted line, in a conventional example, in which the concave portion 24 of the cylindrical shaft and the convex portion 21A are formed into similar large and small circular shapes and are provided concentrically, the relation of the lengthwise angle $\alpha$A and the widthwise angle $\beta$A of the oscillation angle $\theta$ between the cylindrical bearing member and the cylindrical shaft, which is controlled by the cooperation of the convex portion 21A and the concave portion 24, is that the widthwise angle $\beta$A is controlled to an equal amount to the lengthwise angle $\alpha$A as shown in FIG. 4(b) with a dotted line. Thus, the sealing range of the seal 25 must be larger than necessary, thereby inviting difficulty in sealing. In addition, when the rod 12 is curved, larger allowance space more than necessary around the rod 12 must be secured since the angle of inclination of the rod tends to be larger.

This invention is not restricted only to the above embodiment, and it is apparent that it may be changed in many ways without departing from the spirit thereof.

For instance, the convex portion of the spherical bearing member is not restricted to an oval shape, and may alternately be formed into elliptic, rhombic or cruciate shapes as shown in FIGS. 5 to 7. Essentially, any shape will do for the convex portion of the spherical bearing member, so long as it is formed by setting its width perpendicular to the rod axis to be larger than the width in the axial direction of the rod.

As described above, in the present invention, the convex portion of the spherical bearing member is formed to have the width perpendicular to the rod axis, being larger than the width in the axial direction of the rod, so that, for the oscillation angle $\theta$ between the cylindrical bearing member and the cylindrical spherical shaft, the relation of the lengthwise angle $\alpha$ to the widthwise angle $\beta$ can be set freely.

What is claimed is:

1. A joint apparatus connecting a rotatable member to a rod, having a central axis, for oscillation of said rod, comprising:
   a spherical bearing member formed of resin, said spherical bearing member defining an interior spherical bearing surface and an aperture opening to said interior spherical bearing surface, said rod being connected to said spherical bearing member;
   a substantially cylindrical shaft including a spherical surface, said cylindrical shaft extending through said aperture with said spherical shaft surface being positioned in contact with said spherical bearing surface over a portion thereof;
   a substantially circular concave portion formed as a recess provided at a top of said cylindrical shaft; and
   a convex portion formed projecting from said spherical bearing surface, said convex portion being inserted into said concave portion, said convex portion having a larger diameter perpendicular to said central axis of said rod and also perpendicular to a central axis of said convex portion than a diameter parallel to said central axis of said rod.

2. A joint apparatus according to claim 1, wherein said spherical bearing member includes slits formed adjacent said aperture;
   said larger diameter of said convex portion is in a width-wise direction of said rod 3. A joint apparatus according to claim 1, further comprising dust seal means between a base of said cylindrical shaft and an aperture side of said spherical bearing member, said dust seal means being a ring having a cup shape;
   said larger diameter of said convex portion is substantially perpendicular to said cylindrical shaft 4. A joint apparatus according to claim 1, wherein said convex portion is oval.

5. A joint apparatus according to claim 1, wherein said convex portion is elliptic.

6. A joint apparatus according to claim 1, wherein said convex portion is rhombic.

7. A joint apparatus according to claim 1, wherein said convex portion is cruciate.

8. A joint apparatus according to claim 1, wherein said joint apparatus is connected to a wiper of a vehicle.

* * * * *